United States Patent
McMahon et al.

(10) Patent No.: US 12,037,139 B2
(45) Date of Patent: Jul. 16, 2024

(54) AIRCRAFT ASSEMBLY

(71) Applicant: AIRBUS OPERATIONS LIMITED, Bristol (GB)

(72) Inventors: Andrew McMahon, Bristol (GB); Saif Rafique, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 302 days.

(21) Appl. No.: 17/612,177

(22) PCT Filed: Sep. 21, 2020

(86) PCT No.: PCT/EP2020/076216
§ 371 (c)(1),
(2) Date: Nov. 17, 2021

(87) PCT Pub. No.: WO2021/058411
PCT Pub. Date: Apr. 1, 2021

(65) Prior Publication Data
US 2022/0212815 A1    Jul. 7, 2022

(30) Foreign Application Priority Data
Sep. 26, 2019 (GB) .................................. 1913900

(51) Int. Cl.
| *B64F 5/10* | (2017.01) |
| *B64C 1/12* | (2006.01) |
| *B64C 3/26* | (2006.01) |
| B64C 1/00 | (2006.01) |
| B64C 3/18 | (2006.01) |

(52) U.S. Cl.
CPC .................. *B64F 5/10* (2017.01); *B64C 1/12* (2013.01); *B64C 3/26* (2013.01); B64C 2001/0054 (2013.01); B64C 3/187 (2013.01)

(58) Field of Classification Search
CPC ..................................... B64C 1/12; B64C 3/26
See application file for complete search history.

(56) References Cited

U.S. PATENT DOCUMENTS
| 3,716,092 A | 2/1973 | Serewicz |
| 4,289,060 A | 9/1981 | Emmett |
(Continued)

FOREIGN PATENT DOCUMENTS
| DE | 20 2005 015 190 | 1/2006 |
| DE | 10 2007 003 276 | 7/2008 |
(Continued)

OTHER PUBLICATIONS

Combined Search and Examination Report for Application No. GB1913900.5 dated Mar. 24, 2020, 7 pages.
(Continued)

*Primary Examiner* — Nicholas McFall
(74) *Attorney, Agent, or Firm* — Nixon & Vanderhye P.C.

(57) ABSTRACT

An aircraft assembly is disclosed having a first structural component and a second structural component. A fastener fastens the first component to the second component. The first structural component includes a body and an insert in the body. The insert has a machined hole through which the fastener extends. The material hardness of the insert is lower than the material hardness of the body.

19 Claims, 3 Drawing Sheets

(56) References Cited

U.S. PATENT DOCUMENTS

| | | | |
|---|---|---|---|
| 5,335,893 A | 8/1994 | Opp | |
| 8,985,516 B2* | 3/2015 | Kismarton | B32B 7/12 |
| | | | 244/132 |
| 2008/0226413 A1 | 9/2008 | Stephen | |
| 2009/0304438 A1* | 12/2009 | Kolax | F16B 19/06 |
| | | | 403/24 |
| 2015/0337886 A1 | 11/2015 | Coronado | |

FOREIGN PATENT DOCUMENTS

| | | |
|---|---|---|
| DE | 10 2017 220 729 | 5/2019 |
| EP | 2 484 920 | 8/2012 |
| EP | 2 653 376 | 10/2013 |
| FR | 2 939 406 | 6/2010 |

OTHER PUBLICATIONS

International Search Report for PCT/EP2020/076216 dated Jan. 13, 2021, 3 pages.
Written Opinion of the ISA for PCT/EP2020/076216 dated Jan. 13, 2021, 7 pages.

* cited by examiner

AIRCRAFT ASSEMBLY

CROSS REFERENCE TO RELATED APPLICATIONS

The present application is a National Phase of International Application Number PCT/EP2020/076216 filed Sep. 21, 2020, which designated the U.S. and claims priority benefits from Great Britain Application Number GB 1913900.5 filed Sep. 26, 2019, the entire contents of each of which are hereby incorporated by reference.

FIELD OF THE INVENTION

The present invention relates to an aircraft assembly. The present invention also relates to an aircraft structural component, an aircraft, and a method of assembling an aircraft assembly.

BACKGROUND OF THE INVENTION

During a process of assembling an aircraft assembly, structural components are brought together and fastened to each other with fasteners. One such process involves holding the components relative to each other in one or more jigs, undertaking a machining operation to drill holes in the components to receive fasteners, and fastening fasteners through the holes to mount the components to each other.

Following formation of the holes by drilling, the components need to be disassembled to allow for a deburring process to be undertaken. This allows for the removal of chaff from around the holes generated by the machining operation. The components are then repositioned and the fasteners inserted through the aligned holes in a fastening operation.

One such aircraft assembly is a wing box assembly which includes upper and lower covers with other components received between the upper and lower covers, such as spars, ribs and landing gear ribs. Removing the covers to enable the deburring operation to take place is an inefficient and time consuming process.

It has been recognised that it is unnecessary to undertake a deburring operation for components formed from some materials used in aerospace applications, for example aluminium and carbon fibre reinforced plastic. However, it is also recognised that the use of such materials in some applications is unsuitable, for example when a high loading capability is required.

SUMMARY OF THE INVENTION

According to an aspect of the invention, there is provided an aircraft assembly comprising: a first structural component; a second structural component; a fastener fastening the first component to the second component; wherein the first structural component comprises a body and an insert in the body, the insert having a machined hole through which the fastener extends; and wherein the material hardness of the insert is less than the material hardness of the body.

With such an arrangement, a machining process to form a hole in the first component during an assembly process will act on a material having a lower hardness value than the remainder of the component. As such, the wear on the tool, for example a drill bit or grinding tool is minimised. Furthermore, the need to provide a deburring process may be reduced or eliminated. As such, the need to separate the components during the assembly process following a machining operation and prior to a fastening operation is removed.

The likelihood of swarf formed by the machining process acting on adjacent parts is minimized.

The machining process to form a hole may be a drilling process. The machining process to form a hole may be a grinding process.

The material hardness of the second structural component adjacent to the insert may at least substantially correspond to the material hardness of the insert.

With such an arrangement, the ease of forming a hole through both structural components is maximized.

The second structural component may abut the insert.

The body and the insert may form a one piece component. The insert may be mechanically fixed in the body. The insert may be formed from a cured resin. The insert may be cured in the body during manufacture.

The insert may be a plug of material.

The insert may have a maximum material hardness of 200 Vickers Hardness (HV), preferably a maximum material hardness of 175 HV, and more preferably a maximum material hardness of 125 HV. However, it will be understood that the material hardness of the insert is dependent on the material hardness of the body. The material hardness of the insert may also be dependent on the material hardness of one or more adjacent components in the stack of components.

The insert may be formed from at least one of aluminium and carbon fibre reinforced plastic.

The body may be formed from one of steel and titanium.

The insert may extend through the body.

The insert may be in an interference fit with the body. The insert may be, for example, welded in the body, bonded in the body, cured in the body, cold worked in the body, or press fit in the body. Accordingly, the load transfer path between the insert and the body is enhanced in a shear load direction.

The insert may comprise a lip, the lip being engaged in the body to retain the insert in an axial direction of the fastener. Accordingly, the load transfer path between the insert and the body is maximized in a pull through load direction.

A portion of the insert may be retained between the body and the second component.

The aircraft assembly may comprise a key configuration between the insert and the body which is configured to prevent rotation of the insert relative to the body about an axis of the fastener.

The insert may have a central axis. The machined hole may be offset from the central axis.

The insert may be one of an array of inserts in the body.

The fastener may be one of a plurality of fasteners. At least one of a plurality of fasteners may extend through each of the inserts.

The fastener may comprise a blind fastener.

The aircraft assembly may be a landing gear assembly.

According to another aspect of the invention, there is provided an aircraft assembly comprising: a first structural component; a second structural component; a fastener fastening the first component to the second component; wherein the first structural component comprises a body and an insert in the body, the insert having a machined hole through which the fastener extends; and wherein at least one of the material hardness, the material toughness, the material abrasiveness and the material ductility of the insert is less than the corresponding material hardness, material toughness, material abrasiveness and material ductility of the body.

According to another aspect of the present invention, there is provided an aircraft structural component for assembly in an aircraft assembly, the structural component comprising: a body; an insert in the structural component; wherein the insert is arranged to be bored to form a fastener receiving hole during assembly of the component with another component; and wherein the material hardness of the insert is less than the material hardness of the body.

The insert may be a solid portion.

The insert may be a disc.

The insert may be fixed in the body.

The insert may be one of an array of inserts, wherein each of the array of inserts corresponds to a component mounting point.

According to another aspect of the present invention, there is provided an aircraft comprising at least one of the aircraft assembly as set out above and the aircraft component as set out above.

According to another aspect of the present invention, there is provided a method of assembling an aircraft assembly, the method comprising: providing first and second aircraft structural components, the first aircraft component comprising a body with an insert wherein the material hardness of the insert is less than the material hardness of the body; aligning the first component with the second component; forming a hole in the insert; and inserting a fastener through the hole in the insert to fasten the first component with the second component.

According to another aspect of the present invention, there is provided a method of assembling an aircraft assembly, the method comprising: providing first and second aircraft structural components, the first aircraft component comprising a body with an insert wherein at least one of the material hardness, the material toughness, the material abrasiveness and the material ductility of the insert is less than the corresponding material hardness, material toughness, material abrasiveness and material ductility of the body; aligning the first component with the second component; forming a hole in the insert; and inserting a fastener through the hole in the insert to fasten the first component with the second component.

The method may comprise, following forming the hole in the insert, without moving the first and second components apart, inserting the fastener to fasten the first and second components together.

The method may comprise providing the first aircraft component with the material hardness of the insert substantially corresponding with the material hardness of the first aircraft structural component.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
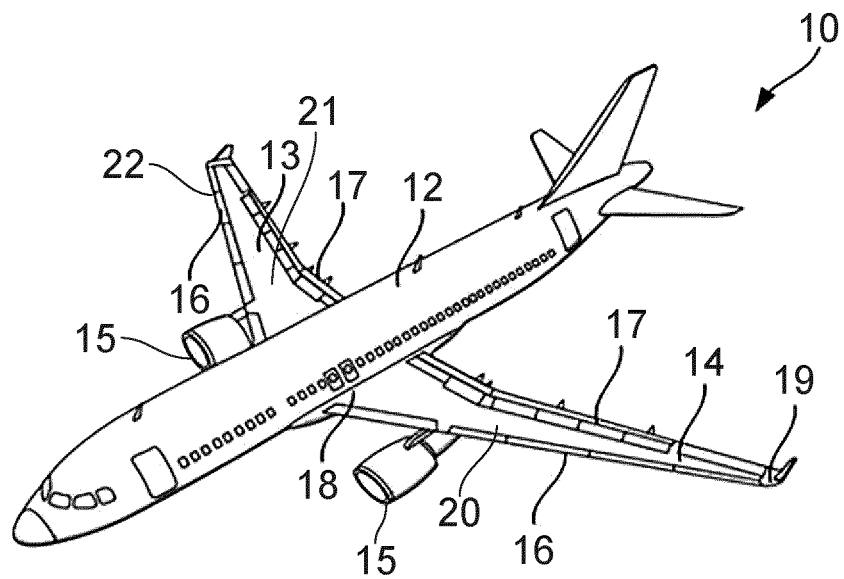
FIG. 1 is a perspective view of an aircraft.

FIG. 1 shows an aircraft 10. The aircraft 10 has a fuselage 12, and starboard and port fixed wings 13, 14. An engine 15 is mounted to each wing 13, 14. The aircraft 10 is a typical jet passenger transport aircraft but the invention is applicable to a wide variety of fixed wing aircraft types, including commercial, military, passenger, cargo, jet, propeller, general aviation, etc. with any number of engines attached to the wings or fuselage. The invention is also applicable to other aircraft, such as helicopters.

Each wing has a cantilevered structure with a length extending in a span-wise direction from a root 18 to a tip 19, with the root 18 being joined to the aircraft fuselage 12. The wings 13, 14 are similar in construction and so only the starboard wing 13 will be described in detail. The wing 13 has a leading edge 16 and a trailing edge 17. The leading edge 16 is at the forward end of the wing and the trailing edge 17 is at the rearward end of the wing.

The wing 13 comprises a wing box 20. The wing box 20 forms a structural assembly including forward and rear spars (part of the rear spar shown in FIG. 2), ribs extending between the forward and rear spars, upper and lower covers, 21, 22, and other components.

The wing 13 has a span-wise axis which extends in a direction from the wing root 18 to the wing tip 19, and a chord-wise axis which extends in the direction from the leading edge 16 to the trailing edge 17.

The aircraft 10 has landing gear assemblies (not shown). A starboard landing gear is selectively extendable from the starboard wing 13, a port landing gear is selectively extendable from the port wing 14, and a nose landing gear is selectively extendable from the fuselage 12. The starboard and port landing gears are mounted on the wing boxes 20 of the wings 13, 14.

Figure 2:
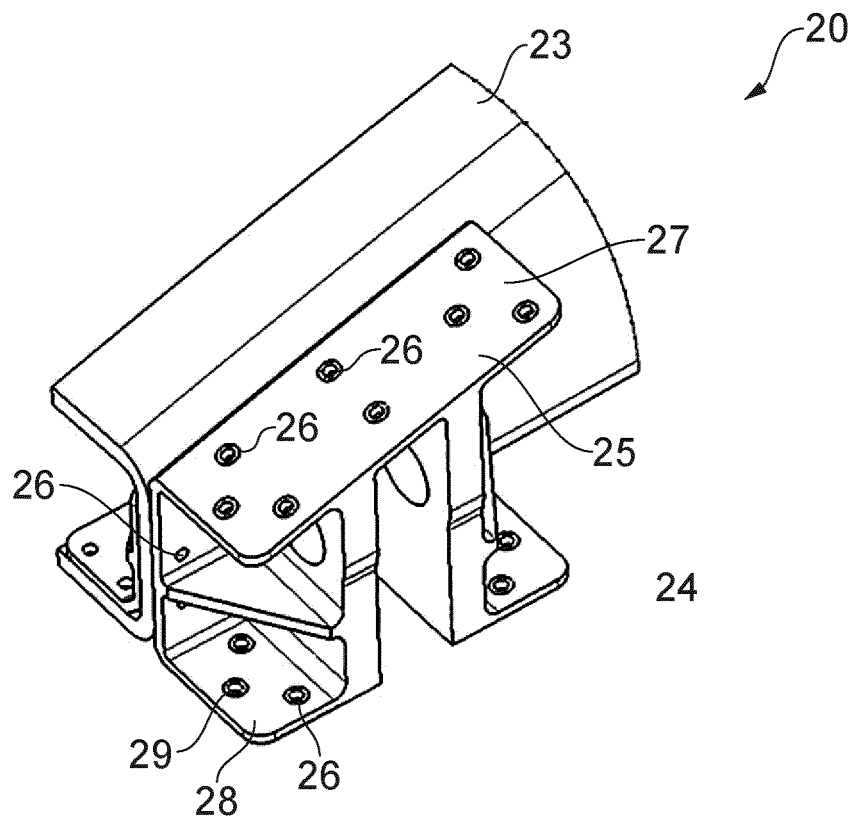
FIG. 2 is a perspective view of part of a wing box assembly including a rear spar, and a landing gear rib with upper and lower covers omitted from view.

Referring to FIG. 2, a section of the wing box 20 is shown. The section of the wing box 20 shown includes part of a rear spar 23. A landing gear rib 24, also known as a gear rib, is mounted on the rear spar 23. The gear rib 24 acts as part of the mount for the landing gear assembly. The gear rib 24 is fixedly mounted to the rear spar 23.

The upper and lower covers, 21, 22 are omitted from view in FIG. 2. The upper cover is positioned on the upper side of the rear spar 23 and the lower cover is positioned on the lower side of the rear spar 23. The gear rib 24 extends between the upper and lower covers. The gear rib 24 is mounted to the upper cover and the lower cover when the wing box 20 is assembled.

The gear rib 24 includes a body 25. The body 25 includes an array of component mounting points 26. The component mounting points 26 enable other components to be fastened with the gear rib 24. The body 25 includes an upper cover mounting flange 27 and a lower cover mounting flange 28. Component mounting points 26 are formed in each of the upper and lower cover mounting flanges 27, 28.

As described herein, the gear rib 24 acts as a first component of an aircraft assembly. The present invention is described herein with reference to mounting the gear rib 24 with each of the upper and lower covers, each acting as a second component of the aircraft assembly, however it will be understood that each of the first and second components may be different components, and the arrangement of the aircraft assembly may differ.

As will become apparent hereinafter, the gear rib 24 is shown part way through an assembly process in which the upper and lower covers 21, 22 have already been positioned with respect to the gear rib 24 (although the upper and lower covers are omitted from view for clarity in FIG. 2) and with fastening bores 29 formed through the upper and lower covers and the gear rib 24 but prior to fasteners being inserted.

Referring now to FIGS. 3 to 7, a process for assembling an aircraft assembly 30, for example the wing box 20, will now be described. The assembly process will be described with reference to first and second components 40, 50. The first and second components 40, 50 are described above as a gear rib and a cover respectively, however it will be understood that the first and second components and the assembly process may relate to alternative components of an aircraft. Furthermore, it will be understood that the assembly process may be applied to more than two components, for example three components having parts in a stacked configuration.

Figure 3:
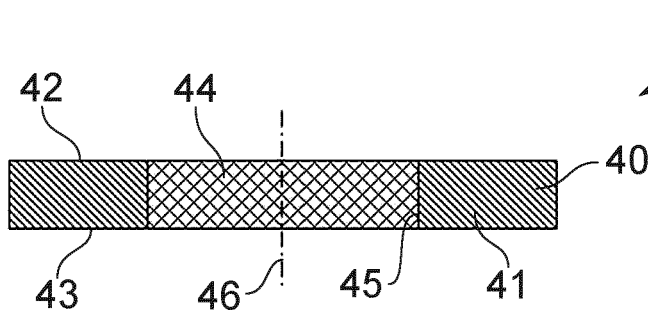
FIG. 3 is a cross sectional schematic view of a first component of an aircraft assembly prior to assembly.

A body 41 of the first component 40 is shown schematically in FIG. 3. The body 41 may include a flange. The first component 40 is formed as a one piece component. The body 41 has a first side 42 and a second side 43. Although the first and second sides 42, 43 are shown parallel to each other, it will be understood that they may be formed at an incline to each other.

An insert 44 is in the body 41. The insert 44 is accommodated extending across the body 41. The insert 44 forms an interference fit with the body 41. The insert 44 may be in the flange. It will be understood the insert may be accommodated in the body 41 in different configurations. The fit between the insert 44 and the body 41 is sufficient to allow for a seamless load transfer between the insert 44 and the body 41 in a shear load direction. The insert 44 and the body 41 are pre-assembled. The insert 44 is pre-formed with the body 41.

The insert 44 is a solid part. That is, the insert 44 is formed without one or more holes extending through the insert through which a fastener may be received. The insert 44 is a disc in an aperture 45 in the body 41. The insert 44 is cylindrical, however it will be understood that the insert 44 may have alternative configurations. For example, the insert 44 may have a non-circular cross-section and may have one or more protrusions and/or recesses formed in the insert 44.

The body 41 of the first component 40 is formed from a titanium alloy. Titanium alloys typically have a material hardness of at least 300 HV, although some alloys, for example dependent on treatment, may have a lower hardness. Alternative materials may be used. For example, the body 41 of the first component 40 may be formed from steel. The material hardness of the material forming the body 41 of the first component 40 has a material hardness value of at least 200 HV. Such materials typically require deburring following the machining of a hole through the material, for example through use of a drill bit or grinding tool.

The insert 44 is formed from a different material to the body 41. The insert 44 is formed from aluminium. The insert 44 may be formed from an alternative material such as carbon fibre reinforced plastic (CFRP). The material forming the insert 44 is a softer material than the material forming the body 41. That is, the material hardness of the insert 44 is lower than the material hardness of the body 41. The material forming the insert 44 has a material hardness of less than 200 HV. However, it will be understood that this is dependent on the relative material hardness of the body 41. That is, the material hardness of the insert 44 is less than the material hardness of the body 41. The insert 44 has sufficient outer dimensions to accommodate a hole for receiving a fastener therethrough. The size of the hole required to be formed through the insert should be sufficient to accommodate the required fastener for fastening the components 40, 50 at the component mounting point 26. The insert 44 is at a predetermined one of the component mounting points 26. The insert 44 is configured to be sized to accommodate any tolerance build up at the component mounting point 26 as predetermined for the assembly of the aircraft assembly 30.

Hardness is described herein by reference to Vickers hardness (HV) as a measure of material hardness, although it will be understood that other methods are used to determine material hardness. Examples of Vickers hardness values are provided below:

| Material | Vickers Hardness |
| --- | --- |
| Ti-6Al-2Sn-4Zr-2Mo (Ti-6-2-4-2), Sheet | 333 |
| Titanium Ti-6Al-4V (Grade 5), Annealed | 349 |
| Titanium Ti-6Al-4V (Grade 5), STA | 396 |
| Ti-15V-3Cr-3Al-3Sn Solution Treated | 222 |
| Steel S99 Forging | 286 |
| Aluminium 2014-T451 | 118 |
| Aluminium 2014-T651 | 155 |
| Aluminium 7050-T7651 | 171 |
| Glass Fibre Reinforced Plastic | 62-74 |
| CFRP | 80-100 |

Figure 4:
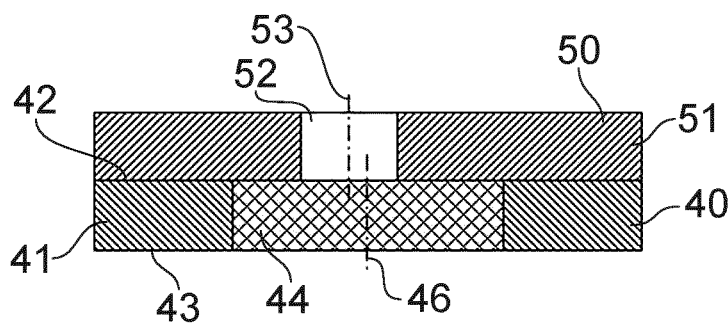
FIG. 4 is a cross sectional schematic view of aligned first and second components of the aircraft assembly at a first stage of the assembly process.

Referring to FIG. 4, the first component 40 is aligned with the second component 50. The second component 50 is moved into abutment with the first side 42 of the body 41. The first and second components 40, 50 are aligned to be fastener together in a predetermined stacked arrangement.

The second component 50 includes a body 51. The body 51 may form the whole or part of the second component 50. The body 51 may include a flange. The second component 50 is formed from carbon fibre reinforced plastic. It will be understood that the second component 50 may be formed from an alternative material such as aluminium, titanium, or steel.

In the present configuration, the second component 50 is shown with a pre-formed hole 52. The pre-formed hole 52 extends through the body 51. The hole 52 may be preformed prior to bringing the first and second components 40, 50 together. The hole 52 may be formed during the assembly process. It will be recognised that in an embodiment in which the second component is formed from a material having a material hardness substantially corresponding to that of the insert then any hole formed during the assembly process can be formed without a requirement for a subsequent deburring operation.

The hole 52 is aligned with the insert 44. That is, the hole 52 fully overlaps the insert 44. The hole 52 does not overlap the body 41. In an arrangement in which the hole 52 is formed during the assembly process, then the position of the hole is pre-defined as a component mounting point 26. The insert 44 is comparatively sized with the preformed hole 52 to accommodate any pre-determined tolerance build ups during assembly of the components 40, 50.

The preformed hole 52 has a second component hole axis 53. It will be noted that the second component hole axis 53 is offset from a central axis 46 of the insert 44. In the event of no misalignment or tolerance build-up, then the second component hole axis 53 and central axis 46 of the insert 44 may be coaxial.

Figure 5:
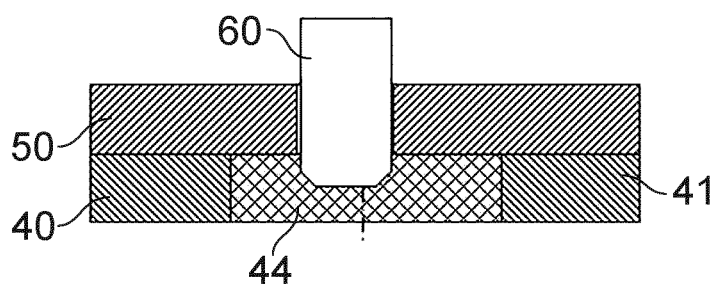
FIG. 5 is a cross sectional schematic view of the first and second components shown in FIG. 4 at a second stage of an assembly process in which the first component is shown partially machined by a bit to form a machined hole.
Figure 6:
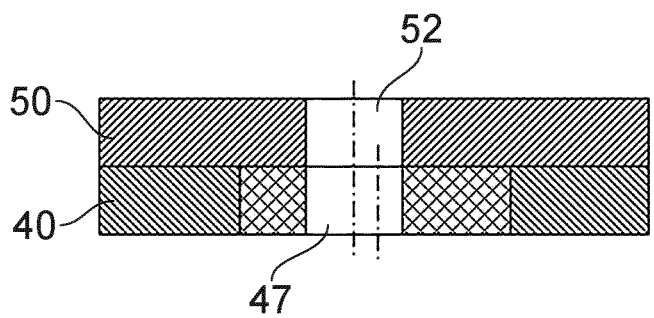
FIG. 6 is a cross sectional schematic view of the first and second components shown in FIG. 5 following the machining process.

Upon alignment of the first and second components 40, 50 in an arrangement for assembly, a machine operation is performed. The machine operation bores a hole. A drill bit 60 is used to bore a through hole 47 in the insert 44. The drill bit 60 is a boring tool. A grinding tool may be used to bore the through hole 47. The drill bit 60 is aligned at the component mounting point 26. In an embodiment in which the hole 52 in the second component 50 is preformed, then the drill bit 60 may be aligned with the axis 53 of the preformed hole 52. Alternatively, the component mounting point 26 is determined and the drill bit 60 is used to form the hole through both the first and second components 40, 50. In FIG. 5, the drill bit 60 is shown during the machining operation partially engaged with the insert 44. The drill bit 60 is acting in a direction through the second component 50 and into the first component 40. In embodiments, the opposite direction may be used.

The machining operation forming the machined hole ensures alignment of the holes 52, 47 through both the first and second components 40, 50. The holes 47, 52 form a fastening bore 48. The axis 53 of the hole 52 in the second component is therefore coaxial with the axis of the through hole 47 in the first component 40. The through hole 47 is formed fully through the insert 44. The insert 44 forms a collar around the through hole 47.

Once the machining operation is complete, a fastening operation is performed. A fastener 70 is inserted through the fastening bore 48. The fastener 70 is fastened in an engaged position to mount the first and second components 40, 50 with each other. It will be recognised that following the machining operation there is no need to deburr either of the first or second components 40, 50, in particular as the machining process acts on a softer material. The material hardness of the insert is less than the corresponding material hardness of the material surrounding the insert.

It will be understood that other material properties may contribute to aid the machining operation. For example, in embodiments at least one of the material toughness, the material abrasiveness and the material ductility of the insert is less than the corresponding material toughness, material abrasiveness and material ductility of the body.

The fastener 70 is shown as a bolt 71 and a nut 72 arrangement. However, it will be appreciated that the fastener 70 may be a blind fastener. That is a fastener that is inserted through the fastening bore 48 and engaged with both of the first and second components 40, 50 from one side of the assembly only. An advantage of this arrangement is that the machining operation and the fastening operation may be performed from the second component side of the assembly 30 only.

Figure 7:
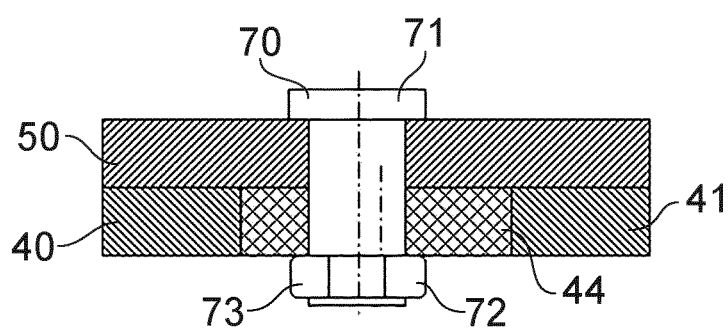
FIG. 7 is a cross sectional schematic view of the first and second components of FIG. 6 at a third stage of the assembly process in which a fastener is received through the fastening bore formed through both the first and second components.

The interference fit between the insert 44 and the body 41 provides for shear loads to be sufficiently transferred between the first component 40 and the fastener 70 to the second component 50. In FIG. 7, the first component side of the fastener is shown in contact with the insert 44 only, however it will be understood that the end 73 of the fastener 70 may be configured to extend over at least part of the body 41. Such a configuration would aid the transfer of a pull through load on the first component 40.

Figure 8:
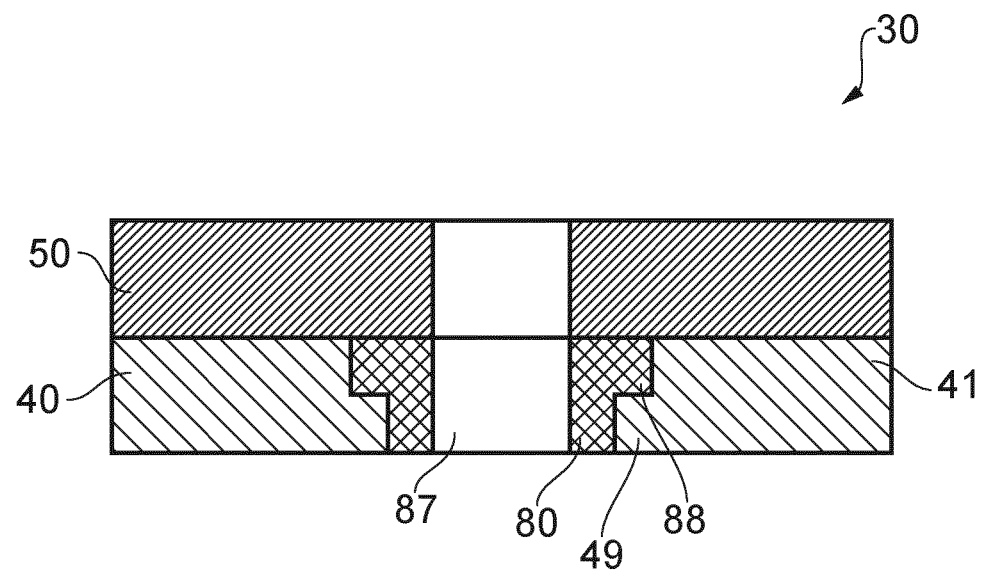
FIG. 8 is a cross sectional schematic view of first and second components of an aircraft assembly during assembly following the machining of the fastening bore through the first and second components with another insert embodiment.

Another embodiment is shown in FIG. 8. The embodiment in FIG. 8 is generally the same as described above and the assembly process is generally the same and so a detailed description will be omitted herein. However, in this embodiment the configuration of the insert differs. FIG. 8 shows a partially assembled aircraft assembly 30 with first and second components 40, 50. The partially formed aircraft assembly 30 is shown following the machining operation and prior to the fastening operation. As such, a through hole 87 is formed through an insert 80. The insert 80 is received in the body 51 of the first component 40. The insert 80 is generally the same as the insert 44 described above, however in this embodiment the insert 80 includes a lip 88. The lip 88 is a circumferentially extending flange. The lip 88 may have a different configuration, and extend only partially around the insert 80. The lip 88 protrudes outwardly. The lip 88 is a protrusion. The lip 88 is received on a shoulder 49 of the body 41. The lip 88 is received between the shoulder 49 and the first side 42 of the body 41. The lip 88 aids retention of the insert 44 in the body 41. When assembled, the lip 88 is received between the shoulder 49 of the body 41 of the first component 40 and the second component 50. As such, the insert 44 is able to handle greater pull through loads acting on the aircraft assembly 30. In embodiments the lip 88 is a countersink.

Figure 9:
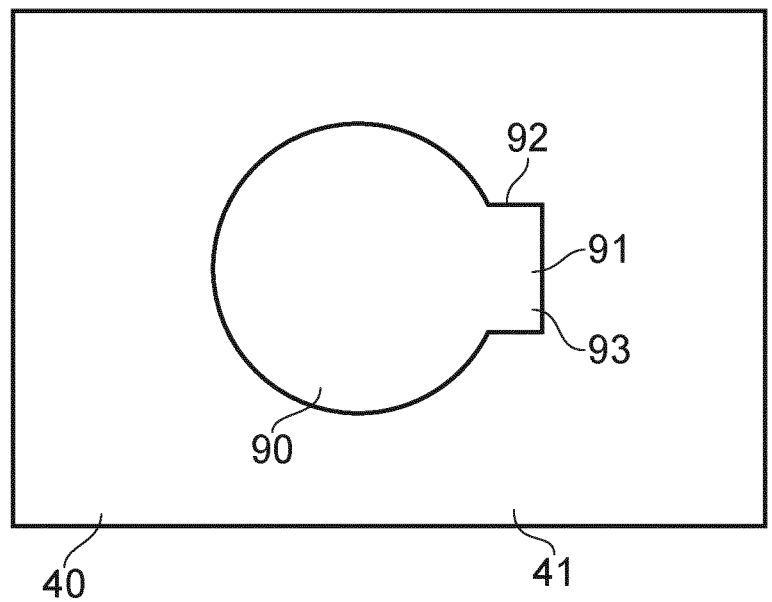
FIG. 9 is a plan view of another embodiment of the first component of the aircraft assembly.

Referring to FIG. 9, another embodiment is shown. The arrangement of this embodiment is generally the same as the embodiments shown above. FIG. 9 shows the first component 40 prior to assembly with the second component 50, and prior to the machining operation. As such, no hole is formed through the insert. An insert 90 is shown in the body 41 of the first component 40. The insert 90 has a key configuration 91. The key configuration includes a key 93 and a key slot 92. The key 93 protrudes from a main part of the insert. The key 93 protrudes radially outwardly in the present embodiment. The key 93 is received in a corresponding key slot 92 in the body 41. The key 93 may have differing configurations and may comprise two or more key features. The key configuration 91 aids prevention of any relative rotation of the insert 90 and the body 41, for example, such as may be applied during the machining process.

In each of the embodiments described above, it will be appreciated that the insert and the body together form the first component 40 as a one piece component. The first component 40 includes a plurality of inserts preassembled with the body 41. The location of the insert 90 corresponds to the position of predetermined component mounting points 26. The inserts are preformed without any through holes formed therein through which fasteners may be engaged, and therefore the fastener receiving holes are formed during the assembly process. It has been recognised that by using a relatively softer material than that of the body of the component, that it is possibly to remove the need for subsequent machining processes following the forming of the hole in the insert and therefore reducing the assembly time. It will be recognised that in some embodiments two or more through holes arranged to receive fasteners may be formed in a single insert.

In the embodiment shown in FIG. 2 in which the first component is a landing gear rib 24 and the second component is one of the covers 21, 22, it will be appreciated that a component that is required to carry a significant load transfer may lead to the cover having to be removed in order to deburr holes machined in the component. However, with the arrangements described above it has been recognised that inserts may be used to allow the holes to be formed in a relatively softer material to remove the further machining requirement and so remove the need to remove the cover. As such, the assembly time and complexity of the assembly process may be reduced. Furthermore, as the tools, for example the drill bits used during the assembly process are required to act on a softer material hardness only, then the wear on these tools is minimised.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft assembly comprising:
   a first structural component;
   a second structural component;
   a fastener fastening the first component to the second component;
   wherein the first structural component comprises a body and an insert in the body, the insert having a machined hole through which the fastener extends; and
   wherein the material hardness of the insert is less than the material hardness of the body, and
   wherein the body is formed from one of steel and titanium, and the insert is formed from one of aluminum and carbon fiber reinforced plastic.

2. The aircraft assembly of claim 1, wherein the material hardness of the second structural component adjacent to the insert is the same as the material hardness of the insert.

3. The aircraft assembly of claim 2, wherein the second structural component abuts the insert.

4. The aircraft assembly of claim 1, wherein the body and the insert form a one piece component.

5. The aircraft assembly of claim 1, wherein the insert has a maximum material hardness of 200 HV and less than 125 HV.

6. The aircraft assembly of claim 1, wherein the insert extends through the body and/or the insert is an interference fit with the body.

7. The aircraft assembly of claim 1, wherein the insert comprises a lip, the lip being engaged in the body to retain the insert in an axial direction of the fastener and/or wherein a portion of the insert is retained between the body and the second component.

8. The aircraft assembly of claim 1, comprising a key configuration between the insert and the body configured to prevent rotation of the insert relative to the body about an axis of the fastener.

9. The aircraft assembly of claim 1, wherein the insert is one of an array of inserts in the body and, wherein the fastener is one of a plurality of fasteners, wherein at least one of a plurality of fasteners extends through each of the array of inserts.

10. The aircraft assembly of claim 1, wherein the fastener comprises a blind fastener.

11. The aircraft assembly of claim 1, wherein the aircraft assembly is a landing gear assembly.

12. An aircraft comprising the aircraft assembly of claim 1.

13. An aircraft assembly, comprising:
   a first structural component;
   a second structural component;
   a fastener fastening the first component to the second component;
   wherein the first structural component comprises a body and an insert in the body, the insert having a machined hole through which the fastener extends;
   wherein the material hardness of the insert is less than the material hardness of the body; and,
   wherein the insert has a central axis, and the machined hole is offset from the central axis.

14. An aircraft assembly, comprising:
   a first structural component comprising:
   a body;
   an insert in the body; and,
   a second structural component;
   wherein the insert is arranged to be bored to form a fastener receiving hole during assembly of the first structural component with the second structural component;
   wherein the material hardness of the insert is less than the material hardness of the body; and,
   wherein the second structural component abuts a first side of the body, and
   wherein the material hardness of the second structural component adjacent to the insert is the same as the material hardness of the insert wherein the body is formed from one of steel and titanium, and the insert is formed from one of aluminum and carbon fiber reinforced plastic.

15. The aircraft structural component of claim 14, wherein the insert is a solid portion and/or the insert is a disc, and/or the insert is fixed in the body.

16. The aircraft structural component of claim 14, wherein the insert is one of an array of inserts, wherein each of the array of inserts corresponds to a component mounting point.

17. A method of assembling an aircraft assembly, the method comprising:
   providing first and second aircraft structural components, the first aircraft component comprising a body with an insert wherein the material hardness of the insert is less than the material hardness of the body;
   aligning the first component with the second component;
   machining a hole in the insert; and
   after machining the hole in the insert, inserting a fastener through the hole in the insert to fasten the first component with the second component.

18. The method of claim 17 comprising, following machining the hole in the insert, without moving the first and second components apart, inserting the fastener to fasten the first and second components together.

19. The method of claim 17, further comprising providing insert with the material hardness of the insert is the same as the material hardness of the second aircraft structural component.

* * * * *